United States Patent [19]
Pierce

[11] Patent Number: 5,345,858
[45] Date of Patent: Sep. 13, 1994

[54] SPRING BRAKE ACTUATOR WITH A PRESSURE PLATE BEARING FOR A CAGING TOOL

[75] Inventor: William C. Pierce, Muskegon, Mich.

[73] Assignee: NAI Anchorlok, Inc., Muskegon, Mich.

[21] Appl. No.: 80,414

[22] Filed: Jun. 21, 1993

[51] Int. Cl.⁵ .............................. F01B 19/00
[52] U.S. Cl. .............................. 92/48; 92/63; 92/96; 91/376 R
[58] Field of Search ............... 91/376 R, 533; 92/48, 92/49, 96, 98 R, 99, 100, 63; 60/547.1

[56] References Cited
U.S. PATENT DOCUMENTS

| | | | |
|---|---|---|---|
| 3,149,542 | 9/1964 | Cruse | 92/98 R |
| 3,187,640 | 6/1965 | Young et al. | 92/48 |
| 3,811,365 | 5/1974 | Gordon et al. | 92/99 X |
| 3,884,446 | 5/1975 | Erickson | 92/98 R X |
| 3,908,520 | 9/1975 | Ma | 92/99 X |
| 4,711,156 | 12/1987 | Kayyod et al. | 92/99 X |
| 4,850,263 | 7/1989 | Rumsey et al. | 92/48 X |
| 4,960,036 | 10/1990 | Gummer et al. | 92/48 X |
| 5,015,727 | 4/1992 | Bowyer | |

FOREIGN PATENT DOCUMENTS 1044848  9/1983  U.S.S.R. ................. 92/99

*Primary Examiner*—Edward K. Look
*Assistant Examiner*—Hoang Nguyen
*Attorney, Agent, or Firm*—Varnum, Riddering, Schmidt & Howlett

[57] ABSTRACT

A spring brake actuator, formed by a housing having an elastomeric diaphragm dividing the interior into two chambers, comprises a pressure plate adjacent the diaphragm in one of the chambers with a large force compression spring between the pressure plate and the housing. A hollow actuator rod is mounted within the chamber for reciprocal movement with the diaphragm and the pressure plate and receives a permanently installed caging tool extending through a housing aperture, a pressure plate aperture and into the hollow actuator rod. The pressure plate includes a bearing in the pressure plate aperture to facilitate reciprocal movement of the pressure plate over the caging tool.

14 Claims, 2 Drawing Sheets

SPRING BRAKE ACTUATOR WITH A PRESSURE PLATE BEARING FOR A CAGING TOOL

BACKGROUND OF THE INVENTION

1. Field of the Invention

The invention relates to fluid-operated brake actuators for vehicles and more particularly to a fluid-operated brake actuator with a bearing for a permanently installed caging tool.

2. State of the Prior Art

An air brake system for a vehicle such as a bus, truck or the like typically includes a brake shoe and drum assembly which is actuated by means of an actuator assembly operated by the selective application of a fluid such as compressed air. Conventional air brake actuators have both a service brake actuator for actuating the brakes under normal driving conditions by the application of compressed air and an emergency or spring brake actuator for actuating the brakes when the compressed air is released. The emergency brake actuator includes a strong compression spring which forces application of the brake when air is released. This actuator is often referred to as the spring brake. Typically, the spring brake actuator is disposed in tandem with the service brake actuator.

The service brake actuator is typically divided into two chambers by a diaphragm. Depressing the brake pedal during normal driving operation introduces compressed air into one of the chambers of the service brake actuator which, acting against the diaphragm, causes a service brake push rod in the opposite chamber to be extended and the brakes to be applied with an application force proportional to the air pressure in the service brake actuator.

In tandem actuator assemblies, a spring brake push rod typically extends from a chamber in the spring brake portion, through an aperture in a wall separating the spring brake actuator from the service brake actuator, and into a chamber in the service brake portion. Because at least one of the adjoining chambers is usually pressurized, a seal is provided at the aperture around the push rod comprising one or more O-rings positioned in annular channels in the wall around the aperture.

The spring brake actuator is typically divided into two chambers, a lower chamber and an upper chamber, separated by a rubber diaphragm and pressure plate, with the spring in the upper chamber acting between an end wall of the spring brake housing and a pressure plate. When full pressure is applied to the lower chamber, air pressure acting against the diaphragm and pressure plate compresses the spring, thereby retracting the pressure plate and diaphragm. The spring brake actuator rod is typically held in a retracted position by a relatively small return spring. In some actuators, the spring brake actuator rod is integral with the pressure plate and held in a retracted position by the air pressure. In both designs, the spring brake actuator rod does not affect the normal operation of the brake.

In the event of a loss of air pressure or an intentional exhaustion of air from the spring brake actuator, the brake will be mechanically activated by the force of the strong compression spring acting on the spring brake actuator rod which, in turn, acts upon the service brake push rod to apply the brakes. Thus, the spring brake portion serves both as a parking brake and an emergency brake.

A caging bolt or tool is used to cage the strong compression spring when, for example, the brake must be manually released. It is known to permanently install a caging bolt in a brake actuator. In one such actuator, a threaded bolt extends through a threaded opening in the actuator housing and into a hollow interior of the spring brake actuator rod, which is affixed to the pressure plate. As the emergency brake or parking brake is applied, the pressure plate and actuator rod reciprocate relative to the bolt. This reciprocation over time causes the threads of the bolt to wear.

SUMMARY OF THE INVENTION

The invention is a fluid-operated diaphragm spring brake actuator comprising a housing having a generally cylindrical shape. An aperture is disposed in a wall of the housing. The housing is divided into a first and second chamber by a diaphragm suspended within the housing. A pressure plate is positioned adjacent to the diaphragm within the first chamber of the housing. The pressure plate has an aperture which is axially aligned with the aperture in the housing. A large force compression spring is disposed between the housing and the pressure plate. A hollow actuator rod has a portion thereof disposed in the second chamber in a position to alternately actuate and release a brake mechanism in response to the reciprocal movement of the diaphragm and pressure plate. The hollow actuator rod further has at one end thereof an axial opening, which is aligned with the pressure plate aperture. A caging tool is mounted to the housing and extends through the housing aperture, pressure plate aperture and the axial opening in the actuator rod. A bearing is mounted within the pressure plate aperture and disposed between the pressure plate and the caging tool to prevent contact between the caging tool and the pressure plate during reciprocal movement of the diaphragm and pressure plate.

Preferably, an annular shoulder is formed in the pressure plate aperture and the bearing has a collar that abuts the annular shoulder. The actuator rod abuts the bearing collar to retain the bearing within the pressure plate aperture. Alternatively, the bearing can be bonded to the pressure plate. Preferably, the bearing and bearing collar are annular and the bearing is made from a high density lubricating polymer, such as polyethylene.

The pressure plate aperture is preferably a stepped bore having a portion sized to receive the actuator rod in a press-fit engagement within the step bore of the pressure plate. The diaphragm is preferably clamped between the pressure plate and the actuator rod.

The spring brake can be combined with a service brake actuator having a housing, a service brake diaphragm suspended within the housing to divide the interior of the housing into a first service chamber and a second service chamber. A service housing pressure plate is disposed within the second service chamber adjacent the service diaphragm. A push rod is disposed in abutting relationship with the service pressure plate and connected to a brake mechanism. A service bearing having a service bearing aperture connects the second brake chamber and the first service chamber so that the actuator rod can extend through the service bearing aperture and into the first service chamber to abut the service brake diaphragm, whereby the reciprocal movement of the actuator rod is transferred to the push rod for reciprocal movement of the brake mechanism in response to the reciprocal movement of the actuator rod.

DETAILED DESCRIPTION OF THE DRAWINGS

Figure 1:
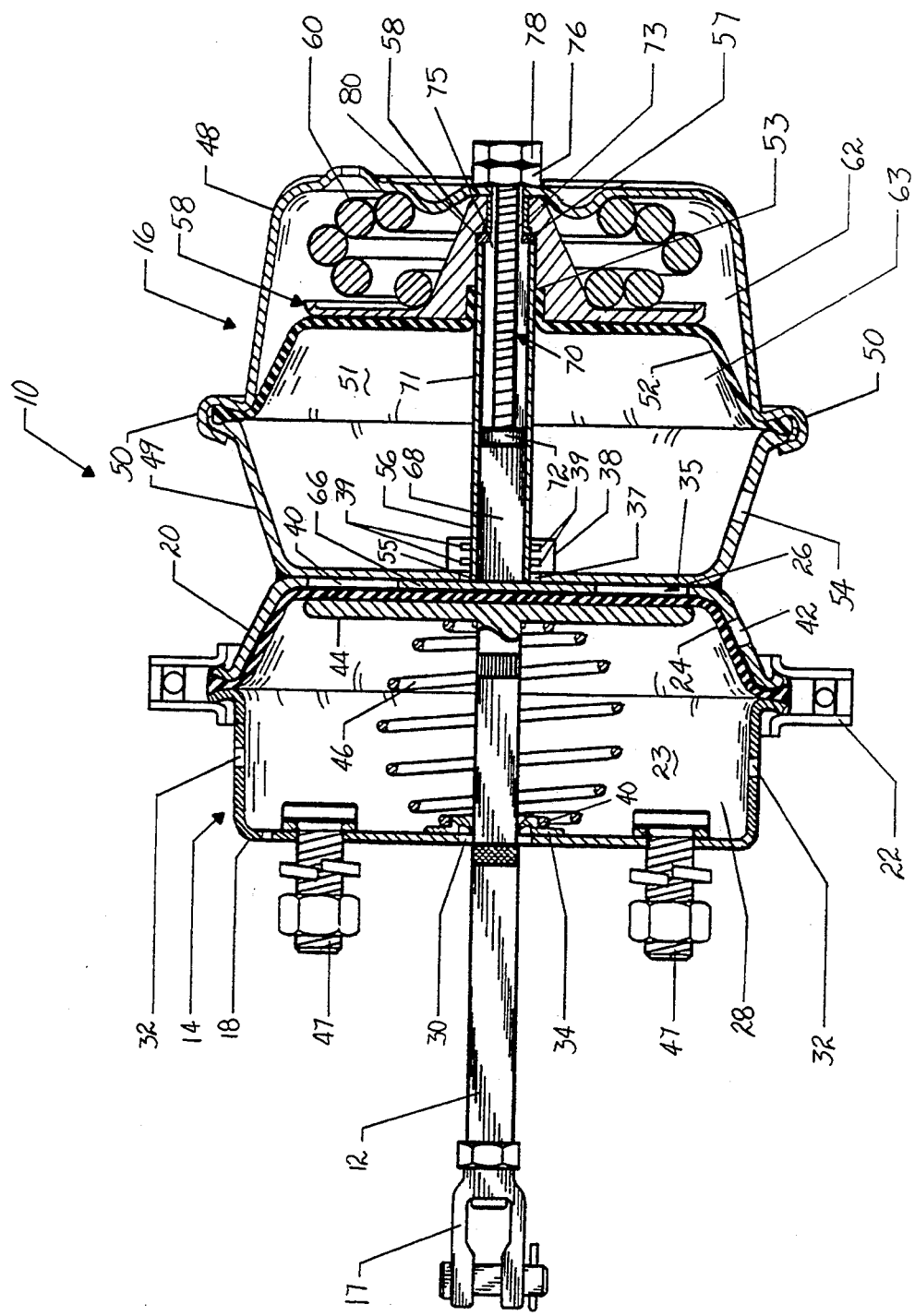
FIG. 1 is a cross-sectional view of an air-operated brake actuator with the caging tool bearing according to the invention.

FIG. 1 illustrates a fluid-operated brake actuator 10 having a general configuration well known in the art. The fluid-operated brake actuator 10 comprises a service brake actuator 14 mounted in tandem to a spring chamber or emergency brake actuator 16. A service brake push rod 12 extends from the service brake actuator 14 for reciprocating movement between a retracted position and an extended, actuating position relative to the service brake actuator 14, and is provided with a clevis 17, which is adapted to connect to a conventional brake shoe and drum (not shown) in a standard fashion. Reciprocating motion of the service brake push rod 12 will cause the brake to be alternately applied and released.

The service brake actuator 14 comprises a lower cup-shaped service housing 18 and an upper cup-shaped service housing 20 joined together by a clamp 22 to form a service brake chamber 23. The adapter housing 20 is also sometimes known as a flange case.

A first elastomeric diaphragm 24 (also known as the service brake diaphragm) is suspended within the service brake chamber 23, the peripheral edge thereof being secured in fluid tight enclosure between the lower cup-shaped service housing section 18 and the upper cup-shaped housing 20 by the clamp 22. The first elastomeric diaphragm 24 separates the service brake chamber 23 into two portions: an upper service chamber 26 and a lower service chamber 28. The upper service chamber 26 communicates with a source of pressurized air (not shown) through an air service port 42 in the upper cup-shaped housing 20. The lower service chamber 28 is vented to the atmosphere through at least one opening 32 in the lower cup-shaped service housing section 18. In FIG. 1, the upper service chamber 26 is shown evacuated so that the first elastomeric diaphragm 24 is forced against the upper cup-shaped housing 20 because of the force from compression spring 46 in the lower service chamber 28.

The service brake push rod 12 extends through a central opening 30 in the lower cup-shaped service housing section 18 and has a pressure plate 44 at the end thereof within the lower service chamber 28. The pressure plate 44 bears against the first elastomeric diaphragm 24. The compression spring 46 extends between the pressure plate 44 and the interior surface of the lower cup-shaped service housing section 18. A push rod guide 34 having an annular seat 40 is disposed above the central opening 30 to guide reciprocal movement of the service brake push rod 12 within the central opening 30 and also to receive the end of the compression spring 46 and retain it in position around the central opening 30. The compression spring 46 thus urges the pressure plate 44 and the service brake push rod 12 to a fully retracted position as depicted in FIG. 1.

To operate the service brake, compressed air is introduced through the air service port 42 into the upper service chamber 26 to create a force against the first elastomeric diaphragm 24 and pressure plate 44 sufficient to overcome the force of the compression spring 46, thereby extending the service brake push rod 12 toward the actuating position. The opening 32 permits rapid evacuation of air from the lower service chamber 28 as the service brake is actuated. Mounting studs 47 are provided to mount the fluid-operated brake actuator 10 onto a vehicle (not shown).

The spring chamber or emergency brake actuator 16 is defined by a lower spring brake housing 49 welded to the upper cup-shaped service housing 20 and a generally cylindrical head 48 or spring chamber, which is clamped to the lower spring brake housing 49 by a clamp 50 to form the spring brake chamber 51. It will be understood that the upper cup-shaped service housing 20 and the lower spring brake housing 49 can be integrally cast of aluminum or similar material. A second elastomeric diaphragm 52, known as the spring diaphragm, is suspended within the spring brake chamber 51, the peripheral edge thereof being secured in fluid tight enclosure between the cylindrical head 48 and the lower spring brake housing 49 by the clamp 50. The second elastomeric diaphragm 52 thus separates the spring brake chamber 51 into two chambers: an upper spring brake chamber 62 and a lower spring brake chamber 63. The lower spring brake chamber 63 during normal operation is filled with pressurized air supplied through an air service port 54 in the lower spring brake housing 49 when the emergency brake is in its normal released position as depicted in FIG. 1.

The lower spring brake housing 49 includes a divider wall 35 which separates the adjoining service brake chamber 23 and spring brake chamber 51. A spring brake actuator rod 56, aligned with the service brake push rod 12, has one end extending from the spring brake chamber 51 through a central opening 37 in divider wall 35 for reciprocating motion through the central opening 37 between a retracted position and an actuating position. One or more O-ring seals 39 are provided adjacent the central opening 37 through which the spring brake actuator rod 56 reciprocates.

A distal end 55 of the spring brake actuator rod 56 terminates in a reaction plate 66 in the upper service chamber 26. The reaction plate 66 is received in an aperture 40 of the upper cup-shaped service housing 20 when the spring brake actuator rod 56 is in the retracted position as depicted in FIG. 1. An opposite, proximal end 57 of the actuator rod 56 extends through an opening 53 in the second elastomeric diaphragm 52 and terminates in a pressure plate 58.

Figure 2:
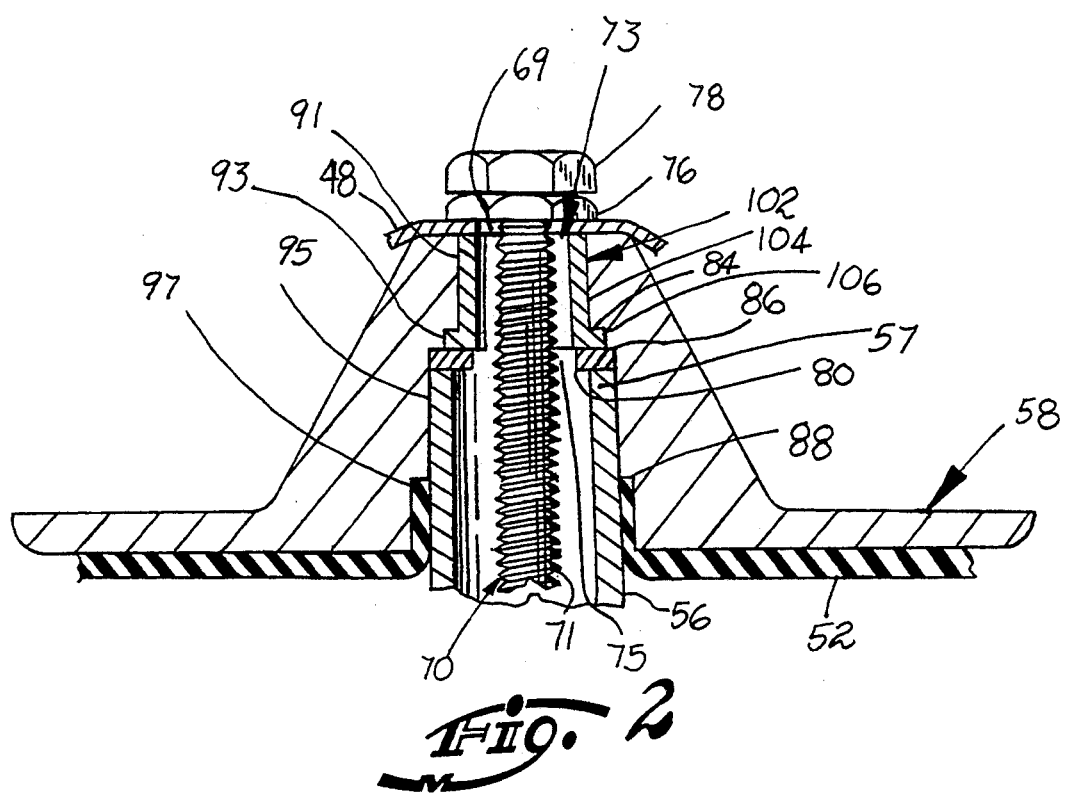
FIG. 2 is an enlarged sectional view of the caging tool bearing and pressure plate of FIG. 1.

The pressure plate 58 abuts an end of a large force compression spring 60. The pressure plate 58 has an aperture 73 extending through the pressure plate 58. Referring now also to FIG. 2, the aperture 73 is a stepped bore defined by first, second and third annular shoulders 84, 86, 88, and first, second, third and fourth sidewalls 91, 93, 95 and 97.

The spring brake actuator rod 56 is press-fitted against the third sidewall 95 and in abutting relationship with the second annular shoulder 86. The second elastomeric diaphragm 52 is press-fitted between the spring brake actuator rod 56 and the fourth sidewall 97.

The spring brake actuator rod 56 is a hollow tube or rod provided with a central bore 68 to accommodate a brake release rod or caging tool 70. The central bore 68 of the spring brake actuator rod 56 receives the caging tool 70, which passes through aligned apertures 69, 73, and 75 in the cylindrical head 48, pressure plate 58 and spring brake actuator rod 56, respectively. The caging tool 70 comprises a threaded elongated shaft 71, with one end having an enlarged head portion 72. The opposite end of the caging tool 70 is threaded through a head nut 76 fixedly mounted to the cylindrical head 48, and further has a hex head nut 78 fixedly secured to the shaft 71.

The caging tool 70 primarily serves to enable manual retraction of the powerful compression spring 60. Rotation of the hex head nut 78 threads the shaft 71 through the head nut 76, and thereby axially moves the caging tool 70 with respect to the cylindrical head 48. The head portion 72 slides freely within the bore 68 of the actuator rod 56, yet is restrained by an inwardly directed annular flange 80 at the actuator rod proximal end 57. Thus, withdrawal of the caging tool 70 by rotation of the hex head nut 78, draws the head portion 72 against the flange 80 to retract the pressure plate 58 and compression spring 60.

Referring more specifically to FIG. 2 and generally to FIG. 1, the pressure plate 58 includes a bearing 102 to prevent the caging tool 70 from contacting the pressure plate 58 and to reduce the wear on the caging tool and the pressure plate. The bearing 102 is self lubricating, made from a polymer or plastic, preferably a high density or high molecular weight polyethylene or polypropylene.

The bearing 102, according to the invention, can be of any desired shape corresponding to the construction of a particular pressure plate. For illustration purposes only and not as a limitation of the invention, the bearing 102 is shown in the preferred embodiment comprising a tubular portion 104 having a collar 106 disposed at one end of the tubular portion. The bearing 102 is mounted within the pressure plate 58 so the tubular portion 104 is disposed within the bore 73 in abutting relationship with the first sidewall 91, with the bearing collar 106 abutting the first annular shoulder 84 and second sidewall 93. The bearing 102 can be affixed to the pressure plate 58 by bonding or other suitable means. It is preferred that the flange 80 of the spring brake actuator rod 56 abut the bearing collar 106 when the spring brake actuator rod 56 is press-fitted into the pressure plate 58 to mechanically secure the bearing 102 to the pressure plate 58 by holding the bearing collar 106 between the first annular shoulder 84 and the flange 80.

During normal operation of the fluid-operated brake actuator 10, the spring brake actuator rod 56 will be in the fully retracted position, as depicted in FIG. 1, by means of compressed air which is maintained in the lower spring brake chamber 63. When the compressed air is exhausted from the lower spring brake chamber 63, the compression spring 60, one end of which abuts the outer end wall of the cylindrical head 48, forces the integral pressure plate 58 and spring brake actuator rod 56 in the direction of the service brake push rod 12. As the pressure plate begins to move, the bearing 102 moves with respect to the caging tool 70.

The force of the compression spring 60 causes the spring brake actuator rod 56 to be extended through the central opening 37, thereby causing the reaction plate 66 to apply a force to the first elastomeric diaphragm 24 and pressure plate 44 of the service brake actuator 14. This action causes the service brake push rod 12 to be extended toward the actuating position, thereby applying the brake (not shown).

When the spring chamber or emergency brake actuator 16 is to be released, compressed air is once again introduced into the lower spring brake chamber 63 to a pressure sufficient to overcome the force of the compression spring 60. The force of the compressed air against the second elastomeric diaphragm 52 forces the pressure plate 58, the spring brake actuator rod 56 and the compression spring 60 to be returned to the position depicted in FIG. 1. As the pressure plate 58 returns to the position of FIG. 1, the pressure plate 58 once again moves with respect to the caging tool 70.

Under certain loading conditions, the sidewall 91 in the aperture 73 of the pressure plate 58 may approach the caging tool 70 as the pressure plate reciprocates. However, the bearing 102 prevents any direct metal-to-metal contact between the caging tool 70 and the pressure plate 58. Rather, the caging tool 70 may contact the high density polymer bearing 102, which does not significantly abrade the caging tool and which extends the life of the brake.

Reasonable variation and modification are possible within the scope of the foregoing disclosure without departing from the spirit of the invention which is defined in the accompanying claims.

The embodiments for which an exclusive property or privilege is claimed are defined as follows:

1. In a fluid-operated diaphragm spring brake actuator, having a generally cylindrical housing with an end wall and an aperture therethrough, an elastomeric diaphragm suspended within the housing to divide the interior thereof into a first chamber and a second chamber, a pressure plate disposed within the first chamber and adjacent to the diaphragm, said pressure plate having a pressure plate aperture axially aligned with the housing aperture, a spring in the upper chamber between the pressure plate and the housing, a hollow actuator rod having an axially open end, said actuator rod further having a portion disposed in the second chamber in a position to alternately actuate and release a brake mechanism in response to reciprocal movement of the diaphragm and pressure plate, and a caging tool mounted to the housing and extending through the housing aperture, the pressure plate aperture and into the hollow actuator rod through the open end, the improvement wherein:

a lubricated bearing is mounted within the pressure plate aperture and disposed between the pressure plate and the caging tool so that the pressure plate can reciprocate relative to the caging tool free of frictional contact with the caging tool.

2. A fluid-operated diaphragm spring brake actuator according to claim 1 wherein the pressure plate has a first annular shoulder in the pressure plate aperture and the bearing has a collar which abuts the first annular shoulder.

3. A fluid-operated diaphragm spring brake actuator according to claim 2 wherein the actuator rod abuts the bearing collar, wherein the bearing is retained within the pressure plate aperture.

4. A fluid-operated diaphragm spring brake actuator according to claim 2 wherein the bearing is bonded to the pressure plate.

5. A fluid-operated diaphragm spring brake actuator according to claim 2 wherein the pressure plate aperture is a stepped bore having a portion thereof sized to receive the actuator rod in press-fit engagement within the pressure plate aperture.

6. A fluid operated diaphragm spring brake actuator according to claim 5 wherein the actuator rod abuts the collar of the bearing when the actuator rod is press-fitted within the pressure plate aperture.

7. A fluid-operated diaphragm spring brake actuator according to claim 6 wherein the actuator extends through the diaphragm and the diaphragm is clamped between the pressure plate and the actuator rod.

8. A fluid-operated diaphragm spring brake actuator according to claim 2 wherein the pressure plate aperture, first annular shoulder, bearing and bearing collar are annular.

9. A fluid-operated diaphragm spring brake actuator according to claim 2 wherein the bearing is made from a high-density polymer.

10. A fluid-operated diaphragm spring brake actuator according to claim 9 wherein the high-density polymer is polyethylene or polypropylene.

11. A fluid-operated diaphragm spring brake actuator according to claim 1 and wherein the bearing is self lubricated.

12. A fluid-operated diaphragm spring brake actuator according to claim 1 and further comprising a service brake actuator having a housing, a service brake diaphragm suspended in the housing to divide the interior thereof into an first service chamber and second service chamber, a service housing pressure plate in the second service chamber adjacent the service diaphragm, a push rod abutting the service pressure plate and connected to a brake mechanism, a service bearing having a service bearing aperture connecting the brake housing and the service housing, said actuator rod extending through the service bearing aperture and into the first service chamber to abut the service brake diaphragm, whereby the reciprocal movement of the actuator rod is transferred to the push rod for reciprocal movement of the brake mechanism in response to the reciprocal movement of the actuator rod.

13. A fluid-operated diaphragm spring brake actuator comprising:

an enclosed housing with a housing aperture in a wall thereof, a movable diaphragm suspended within the housing, and dividing the interior thereof into a first chamber and a second chamber, a pressure plate disposed within the first chamber and adjacent to the diaphragm, said pressure plate having a pressure plate aperture axially aligned with the housing aperture, a spring in the upper chamber between the pressure plate and the housing, a hollow actuator rod having an axial opening at one end thereof, said actuator rod having a portion disposed in the second chamber in a position to alternately actuate and release a brake mechanism in response to reciprocal movement of the diaphragm and pressure plate, a caging tool mounted to the housing and extending through the housing aperture, the pressure plate aperture and the axial opening into the hollow actuator rod, and a bearing mounted within the pressure plate aperture and disposed between the pressure plate and the caging tool.

14. A fluid-operated diaphragm spring brake comprising:

a generally cylindrical housing with a housing aperture in a wall thereof, a fluid-tight dividing means suspended within the housing for dividing the interior thereof into a first chamber and a second chamber, a support means disposed within the first chamber and adjacent to the fluid-tight dividing means in the upper chamber, said support means having a support means aperture axially aligned with the housing aperture, a biasing means in the upper chamber disposed between the support means and the housing for biasing the support means toward the second chamber in response to the exhausting of fluid from the lower chamber, a hollow actuating means in the lower chamber for actuating a brake mechanism in response to movement of the fluid-tight dividing means and support means, said actuating means having an axial opening at one end thereof, a caging means mounted to the housing and extending through the housing aperture, the support means aperture and the axial opening into the actuating means for caging the biasing means between the housing and the support means, and a bearing means mounted between the support means and the caging means for preventing contact between the support means and the caging means.

* * * * *